(No Model.)
B. H. LOCKWOOD.
KNOB ATTACHMENT.
No. 252,682. Patented Jan. 24, 1882.
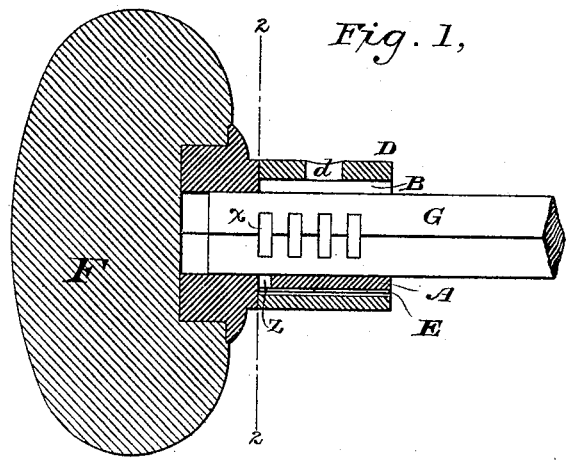
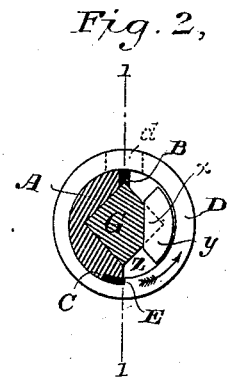
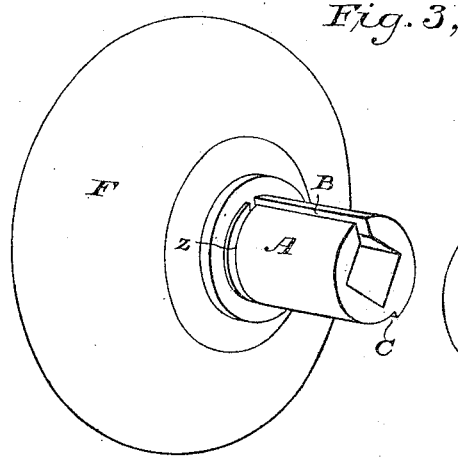
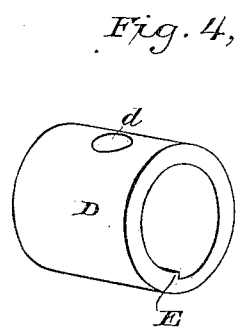
WITNESSES
Wm. A. Skinkle
Geo. W. Breck
INVENTOR
Byron H. Lockwood,
By his Attorneys
Baldwin, Hopkins, & Peyton.
N. PETERS. Photo-Lithographer, Washington, D. C.

UNITED STATES PATENT OFFICE.

BYRON H. LOCKWOOD, OF STAMFORD, CONNECTICUT, ASSIGNOR TO THE YALE LOCK MANUFACTURING COMPANY, OF SAME PLACE.

KNOB ATTACHMENT.

SPECIFICATION forming part of Letters Patent No. 252,682, dated January 24, 1882.

Application filed October 11, 1881. (No model.)

*To all whom it may concern:*

Be it known that I, BYRON H. LOCKWOOD, of Stamford, county of Fairfield, Connecticut, have invented a new and useful Improvement in Knob-Shanks and the Mode of Attaching them to Spindles, of which the following is a specification, reference being had to the accompanying drawings.

My invention relates to knob shanks and spindles which are secured together by frictional contact under great pressure induced by the action of eccentrics. My object is to provide a simple, economical, and reliable connection between a knob shank and spindle, that will permit the ready adjustment of the spindle within the shank to accommodate variations in the thickness of different doors. I am aware that this object has been accomplished before by means different from those which I employ.

In the accompanying drawings, illustrating my invention, Figure 1 is a sectional view of a knob and knob-shank on the line 1 1 of Fig. 2, showing the spindle in elevation. Fig. 2 is a section of the spindle and shank on the line 2 2 of Fig. 1. Fig. 3 is a perspective view of a knob and shank. Fig. 4 is a perspective view of a shank-sleeve. Fig. 5 is a perspective view of a key for keying the shank and spindle together.

I provide a knob-shank, A, with a longitudinal slot, B, extending from the spindle-socket out radially through the wall of the shank, as is well shown in Fig. 3. I also provide a transverse slot, $z$, in the shank, which intersects the longitudinal slot and enables the wall of the shank to be readily compressed and clamped upon the spindle. At the same time the shank remains complete of one piece of metal. This shank, formed in this manner, constitutes the whole of my invention. Instead of making the shank cylindrical, I form on one side of it, about opposite the slot B, an eccentric, C, in order to provide for clamping the walls of the shank upon the spindle. To surround the shank I provide a sleeve, $b$, preferably cylindrical in its external conformation, but provided with an eccentric, E, on its internal surface, and made within to correspond with the external shape of the knob-shank, so as to readily slip onto the shank. This means of clamping a shank upon a spindle by means of eccentrics upon the shank and upon the surrounding sleeve I am aware is not new, and I do not claim it, but simply refer to it as a suitable means for compressing the walls of my improved shank.

The spindle may be provided with little recesses $x$, to receive a segmental key, $y$, passing through the slot $z$ in the shank, as is well understood, thus keying the shank and spindle together; but while this provision is suggested for greater security, I do not deem it absolutely essential. However, as the sleeve will, when in place, cover the key and hold it in its seat firmly, the combination of the sleeve and key affords a very secure and excellent fastening for the shank and spindle. I am aware, however, that such parts and their combination, as described, are not new, and I make no claim therefor.

Suppose the knob F to be secured to the shank in any suitable way, it will then appear as represented in Fig. 3, ready to receive the sleeve over it and the spindle G within it. The spindle being inserted and adjusted, and, if desired, keyed in the shank, the sleeve is slipped into place, and then, by means of a lever or suitable wrench entering the hole $d$, is to be turned hard in the direction of the arrow, Fig. 2. This turning will cause a wedging or binding action of the eccentrics C and E, which will clamp the shank very firmly to the spindle in any position to which it may have been adjusted within the shank, and at the same time, of course, unite the sleeve very firmly to the shank. When the parts are thus adjusted and firmly secured together it will be observed that the turning of the knob in use does not place the least strain or have the slightest effect upon the sleeve. Hence it is not liable to get loose, and it is found in practice that there is only the remotest liability—substantially none at all—of the parts ever getting disturbed in their fixed and rigid relations when originally properly secured.

Having thus described my invention, what I claim as new, and desire to secure by Letters Patent, is—

A door-knob shank provided with a spindle-socket and with a longitudinal radial slot and a transverse slot intersecting the longitudinal slot, substantially as set forth, the two slots communicating with the spindle-socket, whereby the shank may be clamped and held firmly upon a door-knob spindle by any suitable means, substantially as set forth.

In testimony whereof I have hereunto subscribed my name this 6th day of August, A. D. 1881.

B. H. LOCKWOOD.

Witnesses:
 GEO. E. WHITE,
 SCHUYLER MERRITT.